United States Patent
Mello et al.

[15] 3,678,572
[45] July 25, 1972

[54] TOOL CHANGER

[72] Inventors: William R. Mello, Wethersfield; James A. Warren, Simsbury, both of Conn.

[73] Assignee: Colt Industries Operating Corp., New York, N.Y.

[22] Filed: May 15, 1970

[21] Appl. No.: 37,531

[52] U.S. Cl. .................................................29/568
[51] Int. Cl. .........................................B23g 3/157
[58] Field of Search ......................................29/568

[56] References Cited

UNITED STATES PATENTS

| | | | |
|---|---|---|---|
| 3,276,116 | 10/1966 | Stark | 29/568 |
| 3,384,953 | 5/1968 | Schrolucke | 29/568 |
| 3,431,634 | 3/1969 | Balding | 29/568 |
| 3,414,967 | 12/1968 | Erikson | 29/568 |

*Primary Examiner*—Andrew R. Juhasz
*Assistant Examiner*—Z. R. Bilinsky
*Attorney*—Radford W. Luther and Richard A. Dornon

[57] ABSTRACT

A tool changer for a machine tool interchanges a new and an old tool between a storage magazine and the machine tool spindle. The magazine selectively rotates to a transfer position for a particular tool. A transfer slide clamps and moves the new tool from the magazine to a receptacle of a transfer plate. The plate is swung in an arc to a position beneath the spindle where it is rotatively moved to unload and load the spindle with the old and new tools, respectively, then swing back through a return arc to return the old tool to its transfer position at the magazine.

11 Claims, 12 Drawing Figures

FIG_9

INVENTORS
WILLIAM R. MELLO
JAMES A. WARREN

BY Harry R Dumont
ATTORNEY 3,678,572

TOOL CHANGER

CROSS-REFERENCES TO RELATED APPLICATION

This application represents a variation and modification of the tool changer described and shown in U.S. application Ser. No. 668,769 for "Machine Tool" filed on behalf of Alan J. Saunders on Sept. 19, 1967 and now U.S. Pat. No. 3,526,033, which application is of common ownership with the instant application.

BACKGROUND OF THE INVENTION

This invention generally relates to tool changers for machine tools, particularly of the vertical spindle type.

Previously, machine tools have incorporated tool storage magazines located about or below the level of the tool operator. This arrangement has the disadvantage of imposing limitations upon the size and/or movements of the workpiece which the tool operator is to machine because of interference between the workpiece and the magazine. The aforementioned patent solves this problem by providing a movably mounted magazine which is normally above the tool operator, but is adapted to swing downwardly for changing the tool therein. A drawback inherent in such a tool changing arrangement is that the storage capacity of the magazine must necessarily be limited by space and structural considerations, thereby detracting from the versatility of the machine tool. Furthermore, while such an arrangement may be satisfactorily programmed so that tools may be selected out of sequence, it will be appreciated that this selection is facilitated by a fixedly mounted magazine wherein the tool carriers may be easily coded by existing methods.

SUMMARY OF THE INVENTION

The invention provides a tool changing arrangement for a machine tool which maintains the stored tools in a tool storage magazine located above the tool operator so that no interference will be occasioned therebetween. Moreover, the storage capacity of the tool storage magazine of the invention is not limited by those considerations which would impose restrictions upon a magazine which moves to locations proximate the tool operator for tool changing operations.

The invention consists essentially of a tool storage magazine mounted above a tool operator, and a tool change member which is adapted to receive new tools from the magazine and deliver used tools from the operator to the magazine. The tools in the magazine are transferred to and from the tool change member by a transfer mechanism associated with the magazine, so that the required movements of the tool change member are minimized.

Accordingly, it is a primary object of the invention to provide a tool changing arrangement for a machine tool which alleviates problems of interference between stored tools and a workpiece while enhancing tool storage capacity and machine tool versatility.

This and other objects and advantages will become more readily apparent from the following detailed description, taken in conjunction with the accompanying drawings.

DESCRIPTION OF THE PREFERRED EMBODIMENT

Figure 1:
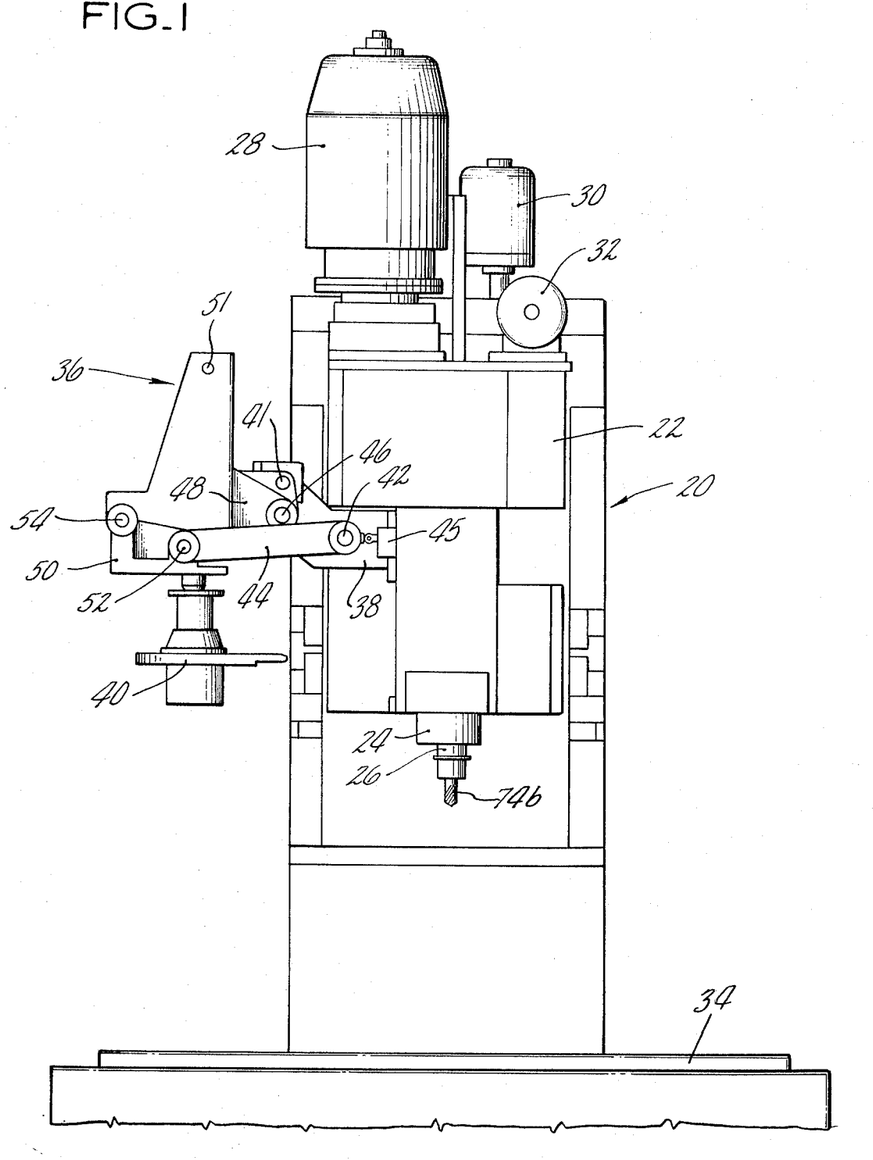
FIG. 1 is a front elevation of a machine suitable for incorporation of the invention.

With reference to FIG. 1, the numeral 20 is used to designate generally a machine tool such as a drill press which may embody our invention. Machine tool 20 includes a head 22, mounted upon a frame, vertically movable in a conventional manner. Mounted within head 22 are a quill 24 and a spindle 26 which constitute a tool operator. Quill 24 is vertically movable within head 22 and spindle 26 is rotatable within quill 24. Drive motors 28, 30 and 32 are provided for rotating the spindle 26, elevating head 22, and raising and lowering quill 24, respectively. The workpiece to be machined is positioned and clamped on a table 34 which is movable along one axis which is perpendicular to movement of a saddle beneath table 34 (not shown) along another axis.

Figure 3:
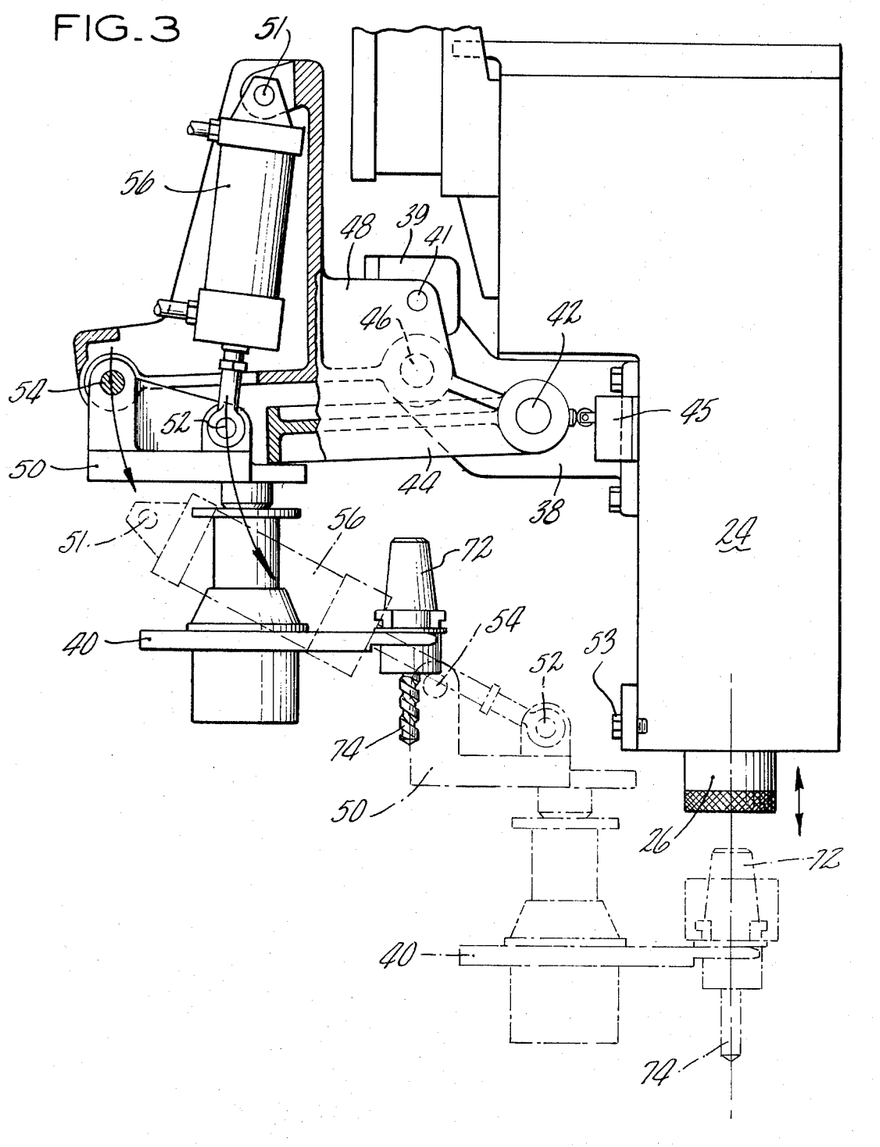
FIG. 3 is a side elevation with parts broken away, showing the mechanism for moving the tool and tool transfer plate from the upper transfer position to the load-unload position below the machine tool spindle.

As will be shown in more detail hereinafter in FIG. 3, a tool change mechanism 36 is mounted on head 22 at its left side by a bracket 38. Included in the tool change mechanism are a transfer plate or tool change member 40 and the apparatus for moving it between an upper position and a lower position proximate spindle 26. Pivotably mounted to bracket 38 as by a pin 42 is a first link 44. Also pivotally mounted to bracket 38 such as by pin 46 is a second member 48. An upstanding projection 39 at the left end of bracket 38 carries a lock pin 41 engageable with an aperture in member 48 to secure the tool change mechanism in its upper position as shown in FIG. 1. A frame 50 carrying transfer plate 40 and its associated parts is pivotally connected through upstanding ear portions to the left hand ends of links 44 and 48, respectively, through pins 52 and 54. A hydraulic cylinder 56, as will be shown in FIG. 3 is used to produce the downward and arcuate motion from the transfer position. The upper and lower ends of cylinder 56 are pivotally connected to pins 51 and 52, respectively.

Figure 2:
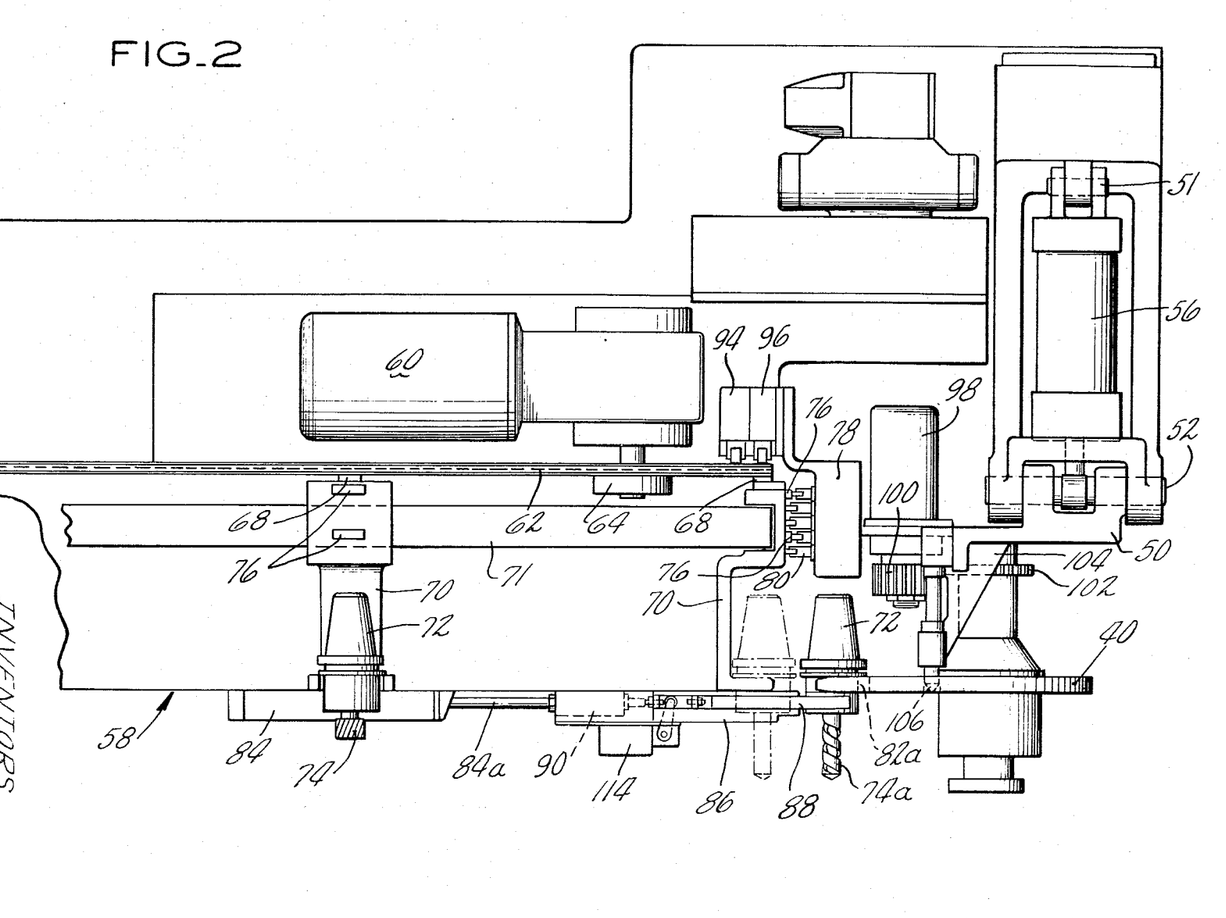
FIG. 2 is a partial side elevation of the machine tool, tool storage and changer apparatus.

FIG. 2 shows the basic parts of the tool storage magazine 58 which is mounted on the machine tool head above the tool operator and adapted to hold a plurality of different cutting tools. Magazine 58 need not necessarily be fixed to the machine tool head but might also be floor or column mounted adjacent to the machine tool. The drive means for the magazine is shown as motor 60 which motor turns a drive chain 62 through a sprocket 64 in engagement therewith. Equally spaced pins 68 in drive chain 62 move tool carriers 70 on antifriction bearings around an oval shaped track 71. Each tool carrier 70 retains a tapered shank tool holder 72 which in turn holds a cutting tool 74 which may be, for example, a drill or a milling cutter. Each tool carrier 70 has fixed thereto a uniquely placed set of cams 76 on its upper end. Identification of the proper tool to be used in the next operation of the machine tool is sensed by an encoder 78 which includes a bank of cam operated code switches 80 registerable and cooperable with the cams 76 on each tool carrier 70. To accomplish the transfer function, a transfer means is provided near the lower portion of storage magazine 58 to provide for the movement of each tool 74 and associated tool holder 72 from its carrier 70 to a receptacle 82a, one of two such juxtaposed receptacles formed in the periphery of transfer plate 40. It will be seen that the transfer means includes a tool transfer mechanism comprising a slide 86 and a drive cylinder 84 therefor. To provide for positive gripping of tool holder 72, a pair of jaws 88 are mounted at the right end of slide 86. A cylinder 90 is provided for opening and closing jaws 88. A return cylinder, not shown, is included for slide 86 to return it to its extreme leftward position. Slowdown and stop switches 94, 96 are positioned as shown to control the operation of motor 60 and to provide stoppage of the proper tool carrier 70 in a transfer position in alignment with linear transfer slide 86. A tool holder 72 and tool 74 are shown in phantom in their carrier 70 at the transfer position and in solid line in their position in receptacle 84a of transfer plate 40. A motor 98 is provided for the rotation of transfer plate 40 through four discrete positions by means of drive gear 100 and driven gear 102. Gear 102 is fixed to shaft 104 to provide this rotative movement of plate 40. A solenoid operated shot pin 106 is mounted above and registerable with several locking holes in plate 40 as will better be shown in FIG. 4 and in FIGS. 5 through 12.

FIG. 3 shows the detail of the mechanism used to move the tool transfer plate 40 between its upper position, which is proximate a tool carrier's transfer position and in alignment with tool storage magazine 58, and its lower tool position proximate spindle 26. The drive and support mechanism for transfer plate 40 is shown is solid line in the upper transfer position. A cam-operated switch 45 is positioned on head 24 for providing control output signals responsive to the completion of downward or upward movement of the transfer plate 40 with its associated linkage. A pair of spaced cams, one of which is shown, is formed on the hub of link 44 to operate switch 45 for this purpose. An adjustable lower stop limit for the movement of frame 50 is provided by screw 53 fixed to head 24. Responsive to the operation of cylinder 56, the entire assembly will be moved downwardly through the vertical arcuate path indicated by arrows into the lower position as is illustrated in phantom. After the used tool 74 has been removed from spindle 26, the tapered upper end of the new tool holder 72 is aligned by rotation to place its axis in line with the center line of spindle 26 preparatory to loading of the new tool 74. A return upward operation of the tool changer is accomplished through operation of hydraulic cylinder 56 in the opposite direction. It should be noted that the axis of rotation of the tool transfer plate 40 remains vertical throughout its bidirectional movement in the arcuate path and that the tool transfer plate is thus maintained in a substantially horizontal position.

Figure 4:
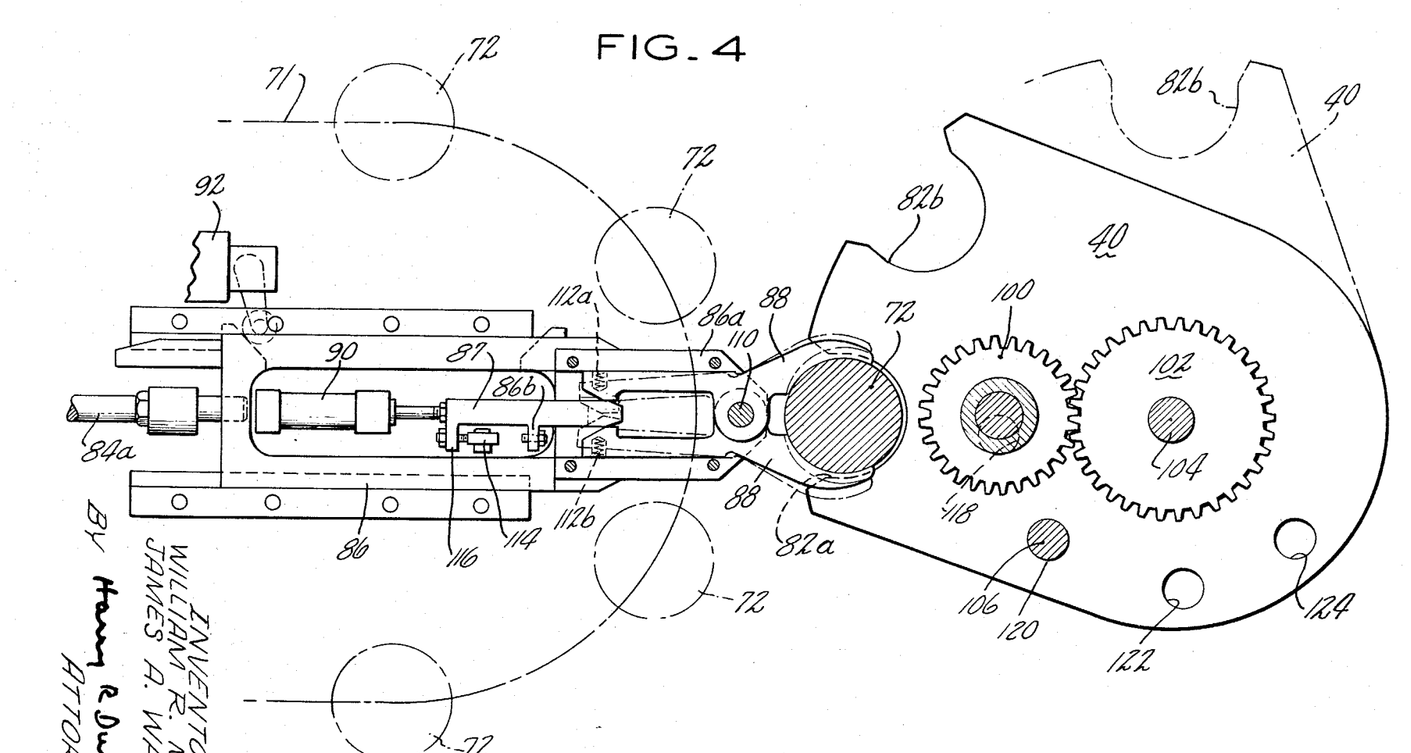
FIG. 4 is a plan view to enlarged scale showing the detail of the mechanism of FIG. 2.

FIG. 4 shows in phantom the outline of the right hand end of the storage magazine including track 71 with tool holders 72 equally spaced thereabout. The tool holder 72 previously advanced to the transfer position has been gripped by jaws 88 and moved rightwardly by slide 86 to a receptacle 82a in transfer plate 40. Jaws 88 are journalled on a pin 110 upstanding from the right hand extension 86a of slide 86. Jaws 88 are further biased normally open by the action of springs 112a, 112b, depending against their left hand ends. While slide 86 is shown in its furthermost right position, an intermediate position is also provided at which position the tool holder 72 is engaged in the position it occupies in the track. Slide 86 is movable rightwardly through the operation of cylinder 84 driving rod 84a. Cylinder 90 has its operating rod attached to rod 87 which carries a bevel shaped right end portion for engaging the left hand ends of jaws 88 to pivot these about pin 110 to a closed gripping position about a tool holder 72. The closed position is designated in solid lines and the open position in phantom. Several limit switches 114 and 92 cooperate with portions of the slide to control its forward and reverse movement as will be explained in the section "Description of Operation" hereinafter. The several radially spaced locating holes in plate 40, engageable by pin 106, are suitably identified by the numerals 118, 120, 122 and 124.

DESCRIPTION OF OPERATION

The description of our invention will now be made with particular attention to the type of tool changer mechanism herein disclosed. We are not here concerned with the manner in which automatic function control of the tool changer mechanism is exercised. It is well known that an automatic tool changer includes a selectively positionable tool storage means which is operated by a suitable control means to bring the proper tool to the tool operator to clamp it and advance it through a given programmed machining operation. The various cycles and subcycles described are performed in accordance with a control tape or card which also serves to position the work with respect to the tool in the spindle. The control system for the apparatus of our invention might readily be incorporated with minor alterations in a machine tool control system such as is described and shown in the aforementioned U.S. Pat. application Ser. No. 668,769. The sequence of operations of our tool changer will now be described with particular reference to the showings of FIGS. 5 through 12.

Figure 5:
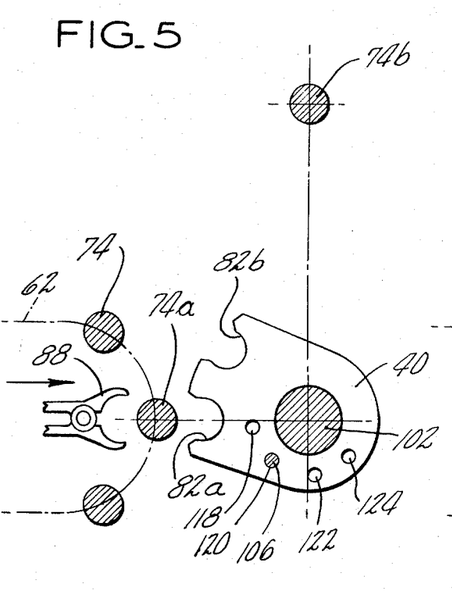
FIGS. 5 through 12 are diagrammatic illustrations showing the mode of operation of our invention through a tool change sequence.
Figure 6:
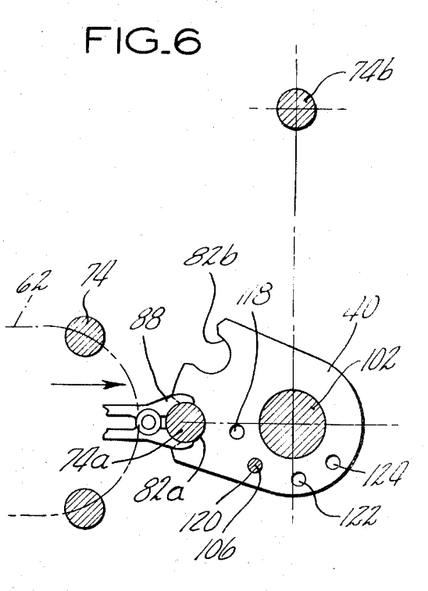

In the initial start-up of operations, the lock pin 41 for the tool changer is retracted. Transfer slide 86 carrying jaws 88 is retained in its extreme leftward position. Jaws 88 are spring biased open by the action of springs 112a and 112b. The tool transfer plate 40 is in its upper position as shown in solid line in FIG. 3. Plate 40 is further in the rotative index position to accept a new tool from the magazine, as shown in FIG. 5. Receptacle 82a is maintained in the position shown through engagement of shot pin 106 in opposed locating hole 120.

The first step is the rotation of tool magazine 58 to a position to place a selected tool in the transfer position. When a tool change function is provided for by the machine tool control system, motor 60 is energized and its brake released. The tool carriers 70 are carried clockwise on track 71, until the selected tool carrier 70 is identified by its cam indicia 76 operating the switches 80 of encoder 78. Slowdown switch 94 is contacted to brake motor 60. The braking continues until stop switch 96 is contacted at which time motor 60 is deenergized and the brake applied.

The second step is to pick up a tool holder 72 and its tool 74 from the transfer position at the right end of the storage magazine where it has been stopped. To clarify the relative positions of the new tool selected and the tool just used in the machine tool operator, the new tool is identified through out FIGS. 5–12 by numeral 74a and the old tool by numeral 74b. Tool transfer begins with the energization of drive cylinder 84 to move transfer slide 86 to its middle position. When the middle position is reached, an associated switch is contacted and cylinder 84 is deenergized.

The next step is to close slide jaws 88 about tool holder 72. This is accomplished as is shown in FIG. 4 by energizing cylinder 90 and moving rod 87 to place its right end portion into engagement with the left ends of jaws 88 to pivot them closed about pin 110. When the jaws 88 are closed, switch 114 will be operated. The operation of switch 114 serves to reenergize cylinder 84 to move slide 86 to its extreme right hand stop 86b. This movement accomplishes the transfer of the tool 74a to transfer plate 40 and into place in its lower receptacle 82a Upon reaching right hand limit 86b, cylinder 84 is deenergized. To open jaws 88 and release tool 74a, cylinder 90 is also deenergized. Upon opening of the jaws 88, a switch 92 is operated to energize a slide return cylinder, not shown, and thus return transfer slide 86 back to its extreme lefthand position. Tool 74a is left retained in the proper receptacle 82a of transfer plate 40. After the loading of new tool 74a in transfer plate 40, the tool carriers 70 on track 71 are rotated until the tool carrier 70 corresponding to tool 74b in spindle 26 has been aligned at the transfer position at the right end of tool storage magazine 58. Transfer plate 40 and the associated tool change mechanism remain in their "up" position until the cutting operation of tool 74b has been completed in spindle 26. Then, machine tool quill 24 moves upwardly, withdrawing tool 74b in spindle 26 from the workpiece being machined. Quill 24 then positions the tool holder 72 retaining tool 74b so that it is readied in line with the subsequent "down" position of transfer plate 40.

The next step includes the rotation of transfer plate 40 about its shaft 104 to an unload position. Shot pin 106 is drawn upwardly from locating hole 120. The drive of motor 98 turns plate 40 clockwise and it is then locked in the position shown in FIGS. 7 and 8 by pin 106 engaging locating hole 122. As is shown in FIG. 7, the empty receptacle 82b is thus aligned with the used tool 74b in the spindle 26 below.

Figure 7:
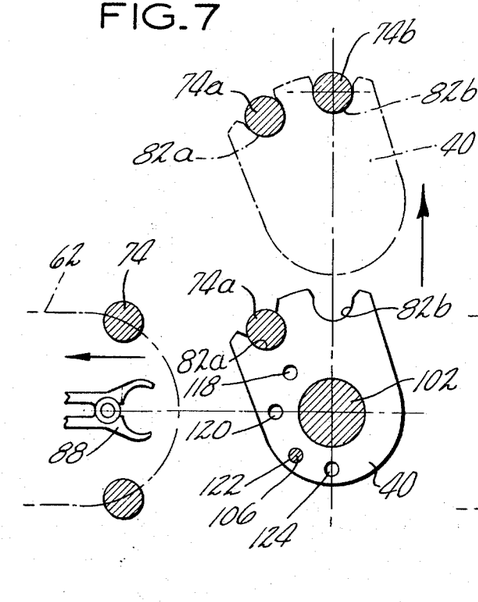

Transfer plate 40 is then indexed downwardly to the dashed line position of FIG. 7 wherein it is proximate the tool operator. Hydraulic cylinder 56 is energized to provide this action as is best shown in FIG. 3. The pivotal motion described about pins 42 and 46 is such that frame 50 mounting transfer plate 40 remain substantially horizontal during its entire upward and downward arcuate movements. Therefore, tool holder 72 and tool 74 are held securely against dislodgment from their respective receptacle in plate 40. The holder 72 retaining used tool 74b in spindle 26 is gripped and the clamp mechanism is automatically disengaged releasing the used tool and holder to the grip of receptacle 82b in plate 40. Quill 24 will then rapid traverse upwardly in preparation for the loading of new tool 74a.

Figure 8:
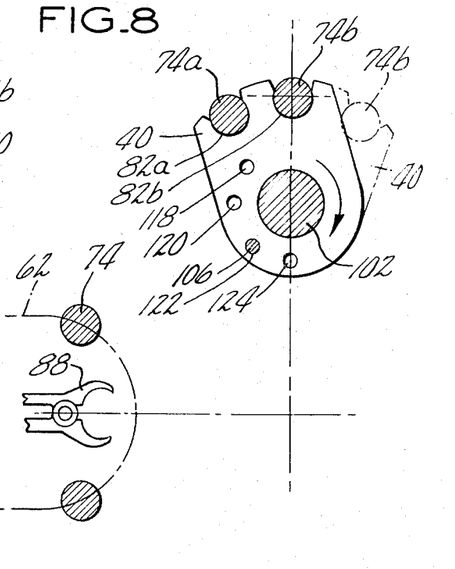

Transfer plate 40 is then rotated clockwise to a load position (shown in phantom in FIG. 8) from the solid line position illustrated in FIG. 8. This places the axis of new tool 74a in line with the centerline of spindle 26 in the manner next shown in FIG. 9. Quill 24 is then moved downwardly to initiate a clamp cycle to lock new tool 74a in spindle 26. It will be seen that the rotation movement of plate 40 is positively limited by the insertion of pin 106 into locating hole 122.

Figures 9, 10:
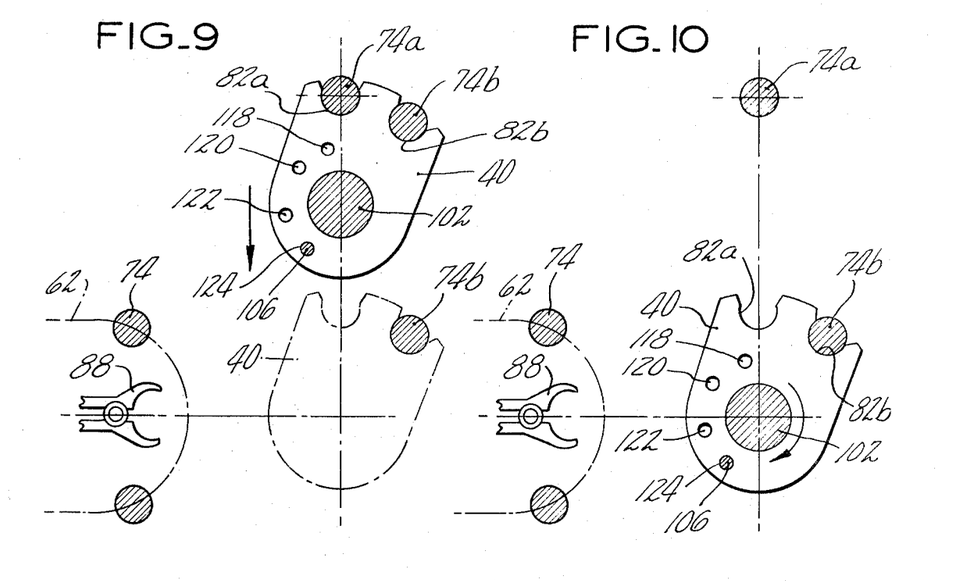

FIG. 9 also shows the following indexing movement of the tool changer upwardly from its position next to spindle 26 into the upper position proximate tool storage magazine 58. This position is assumed to ready the changer for return of the used tool 74b to the storage magazine, i.e. to its corresponding tool carrier 70 which carrier has been prepositioned to the transfer position.

Figure 11:
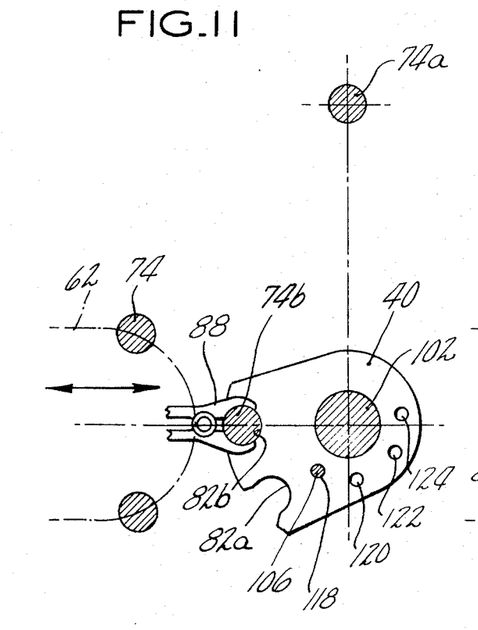

FIGS. 10 and 11 indicate the final rotation of plate 40 clockwise to a used tool discharge position to place used tool 74b in line with the axis of transfer slide 86. Transfer plate 40 is again locked positively in its position by the insertion of pin 106 in a locating hole — in the present instance hole 118. A forward and return operation of the slide with engagement and disengagement of its gripping jaws 88 is initiated in the manner hereinabove described.

Figure 12:
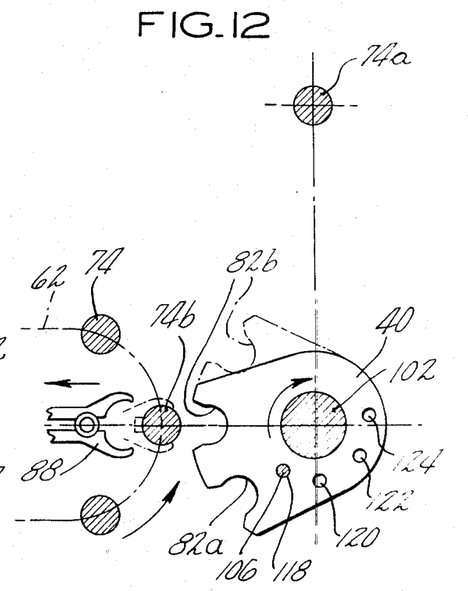

In FIG. 12, the used tool 74b has been withdrawn from receptacle 82b of plate 40 and released in its carrier 70 on track 71. Upon receipt of a tool command signal, track 71 of the tool storage magazine is rotated to position a new tool carrier 70 in the transfer position. Plate 40 is once more readied for rotation clockwise to place lower receptacle 82a in the new tool accepting position preparatory to pickup and the sequence of operations as illustrated in FIG. 5 is then prepared. The repeat operation actually commences after the tool presently machining the workpiece completes its cutting operation.

From the foregoing specification, it will be obvious that we have provided a novel tool changer apparatus marked by its reliability of operation and flexibility of use. Extended tool storage capacity and placement of the tool changer before and after cutting operation permit maximum and most efficient utilization of the machine tool. According to the present invention, tools are stored above the quill so that interference with the workpiece is not possible. The quill extension required is quite small, which is very desirable for heavy milling operations. It will further be seen that minor changes may be made in the construction and arrangement of the parts of our tool changer apparatus without departing from the true spirit and purpose of our invention.

We claim:

1. In a machine tool having a head, a vertically positionable tool operator in said head adapted to retain a first tool and a tool storage means for storing a plurality of tools above said operator and presenting a selected second tool to a transfer position, a tool changer comprising a rotatable transfer plate for receiving and holding said second tool, means for moving said second tool from said storage means to said plate, drive means for moving said plate in a substantially vertical arcuate path from a position proximate said transfer position to a position proximate said tool operator such that the axis of rotation of said plate remains vertical and means for rotating said plate about said axis between an unload and a load position under said operator to remove said first tool from said operator and place said second tool in said operator, said drive means being subsequently operable to return said plate through said arcuate path to said position proximate said transfer position to return said first tool to said tool storage means.

2. The combination as set forth in claim 1 wherein said drive means comprises a fluid motor mounted on said head and a pair of pivotal links coupling said transfer plate to said head such that said plate is maintained in a substantially horizontal position during its movement through said arcuate path.

3. In a machine tool having a head, a vertically positionable tool operator in said head adapted to retain a first tool and a tool storage means for storing a plurality of tools above said operator and presenting a selected second tool to a transfer position, a tool changer comprising a rotatable transfer plate, a slide actuable to remove said second tool from said storage means and place it in said plate, drive means for moving said plate in a substantially vertical arcuate path from a position proximate said tranSfer position to a position below said tool operator such that the axis of rotation of said plate remains vertical and means for rotating said plate about said axis between an unload and a load position under said operator for removing said first tool from said operator and placing said second tool in said operator and between new tool accepting and used tool discharge positions in said position proximate said transfer position, said drive means operable to return said plate through said arcuate path to said position proximate said transfer position, said slide actuable to engage said first tool and replace it in said storage means when said plate is in said used tool discharge position.

4. The combination as set forth in claim 3 wherein said slide includes a pair of pivotal jaws and a cylinder for closing said jaws to grip said tools.

5. In a machine tool having a head, a vertically positionable tool operator in said head adapted to retain a first tool for a cutting operation and a tool storage means for storing a plurality of tools above said operator and presenting a selected second tool to a transfer position, a tool changer comprising a rotatable transfer plate including a pair of juxtaposed receptacles at its periphery, a slide actuable to grip and move said second tool from said transfer position and place it in one of said receptacles in said plate when said plate is in a position proximate said transfer position, drive means for moving said plate with a downward motion from said position proximate said transfer position to a lower position registering the other receptacle with said operator for receiving therein said first tool from said operator, means for rotating said plate to place said one of said receptacles to a position registering with said operator to place it therein, said drive means being operable to return said plate with an upward motion to said position proximate said transfer position, said slide being actuable to receive said first tool in its receptacle and return said first tool to said storage means.

6. The combination as set forth in claim 5 wherein said slide is cylinder-operated and includes a separate gripping means mounted thereon and means for opening and closing said gripping means to engage said tools.

7. The combination as set forth in claim 5 wherein said drive means comprises a linkage means for maintaining said plate in a substantially horizontal plane in said position proximate said transfer position, in said lower position, and during said plate's motion therebetween.

8. The combination as set forth in claim 5 wherein said tool storage means includes a plurality of tool carriers having coded indicia for enabling selection of the desired tool.

9. The combination as set forth in claim 8 wherein said tool storage means further includes a curved closed track for sequentially presenting said carriers to said transfer position.

10. In an improved machine tool of the type having a frame, a vertically movable head attached to said frame, a vertically positionable tool holder in said head adapted to hold a tool, a plurality of separately coded tool carriers for retaining a plurality of tools, means for driving said tool carriers about a closed track, means cooperating with said tool carriers to selectively position each of said tool carriers in a transfer position on said track, and wherein the improvement comprises means for mounting said tool carriers above said tool holder, a tool change member having first and second receptacles for respectively receiving a new tool from one of said tool carriers when said member is in an upper position proximate said transfer position and a used tool from said tool holder when said member is in a lower position proximate said tool holder, means to grip said new tool from said one of said tool carriers and move it to said first receptacle and to grip said used tool in said second receptacle and move it to an empty tool carrier, means to bidirectionally swing said member in a vertically extending arc between said upper and lower positions, and means to rotate said member about a vertical axis to four discrete positions for reception of said new and used tools and for placement of said new and used tools in said tool holder and said empty tool carrier, respectively.

11. In a machine tool, the combination comprising: a frame, a head secured to the frame for upward and downward movement, a vertically positionable tool operator in said head for receiving a tool, a tool storage magazine mounted in said frame above said tool operator and having a plurality of selectively positionable tool carriers for holding a plurality of tools, a tool change member having first and second receptacles for respectively receiving a new tool from said magazine and a used tool from said tool operator, a linkage interconnecting the said frame and said member such that said member is movable in a vertically extending arc between an upper position proximate said magazine and a lower position proximate said operator, is horizontally movable in said upper position between new tool accepting and used tool discharge positions and is horizontally movable in said lower position between load and unload positions, said tool operator being aligned with said second receptacle in said unload position of said member and being aligned with said first receptacle in said load position of said member so that said used tool and said new tool may be respectively placed in said second receptacle and received from said first receptacle during vertical movement of said operator, a tool transfer mechanism mounted in said frame proximate said magazine and adapted to transfer said new tool from one of said tool carriers to said first receptacle when said member is in said new tool accepting position, and to transfer said used tool to an empty tool carrier when said member is in said used tool discharge position.

* * * * *